Jan. 24, 1956  R. W. WAGNER  2,731,838
POWER TAKE-OFF
Filed Aug. 15, 1951  3 Sheets-Sheet 1
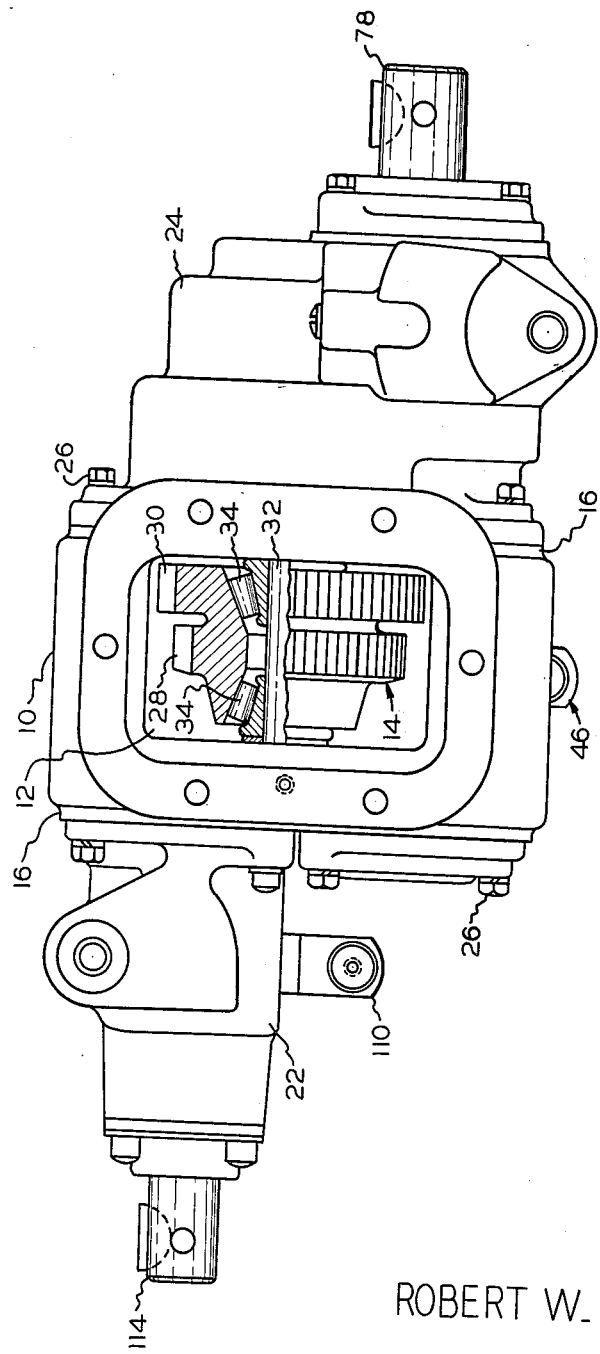
INVENTOR
ROBERT W. WAGNER
BY *Townsend Beaman*
ATTORNEY Jan. 24, 1956
R. W. WAGNER
2,731,838
POWER TAKE-OFF
Filed Aug. 15, 1951
3 Sheets-Sheet 2
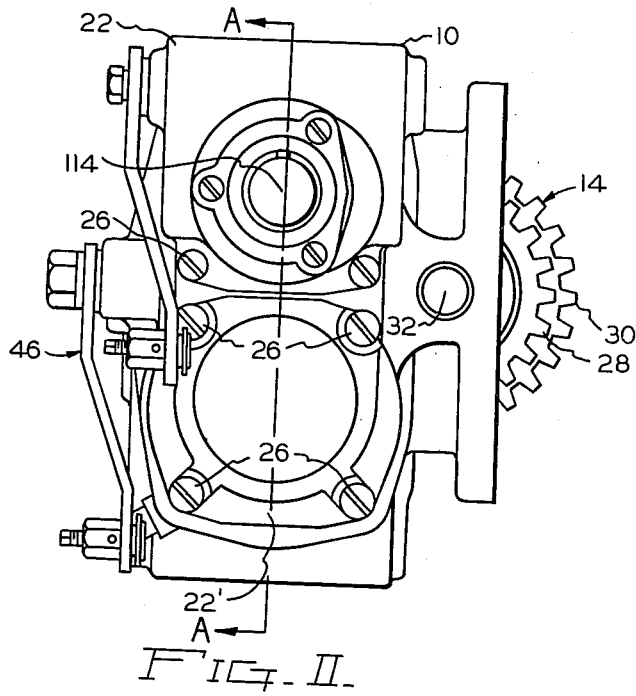
FIG. II.
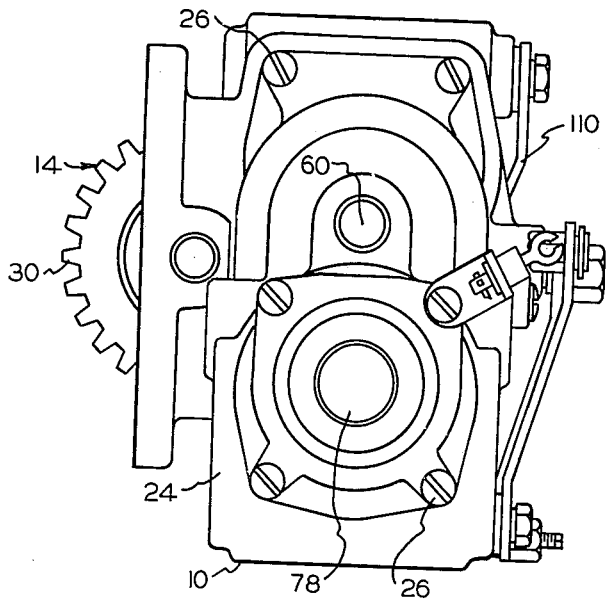
FIG. III.
INVENTOR
ROBERT W. WAGNER
BY Lawrence M Beaman
ATTORNEY

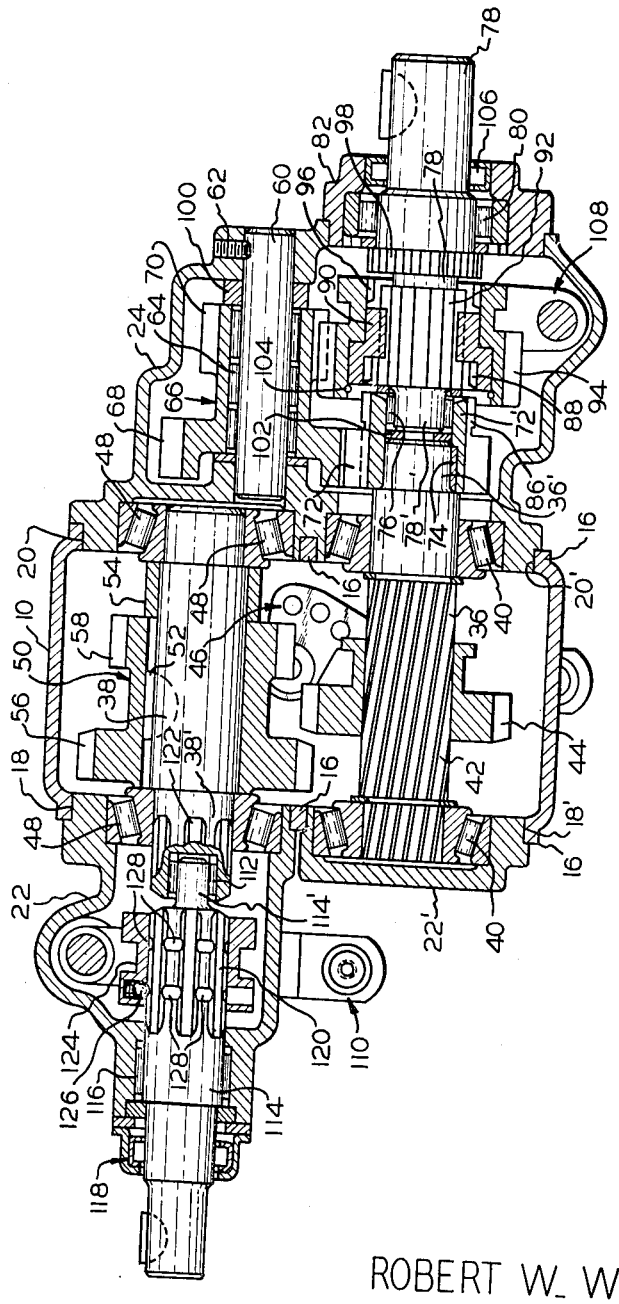

United States Patent Office 2,731,838
Patented Jan. 24, 1956

2,731,838

POWER TAKE-OFF

Robert W. Wagner, Chelsea, Mich.

Application August 15, 1951, Serial No. 241,963

1 Claim. (Cl. 74—15.2)

This invention relates to power take-off units and more particularly to power take-off units which are intended to be installed upon motor vehicles, such as trucks and tractors, so as to be driven from the gear transmission thereon. Considered in one important aspect, the present invention is an improvement upon the power take-off unit disclosed in my co-pending application, Serial No. 91,845, filed May 6, 1949.

With the present day adoption of these power take-off units as exceptionally useful equipment and the requirement that the units should be applicable to various types of motor vehicles and transmissions, it becomes increasingly important that the power take-off units should not only retain their rugged and durable character but that they should be of versatile construction and be capable of being assembled from standardized and interchangeable components to suit the various operating requirements. It is also a present day requirement that these power take-off units should be capable of providing at least two power take-off power shafts driven from the main gear transmission with which the take-off units, as a whole, are operatively associated. Further, that these power shafts of the take-off unit should be readily capable of selective use, at the will of the operator, and be also capable of providing a driving force of variable speed, in either forward or reverse direction.

It is an object of my present invention, therefore, to provide a power take-off unit which is capable of being assembled from standardized and interchangeable components to provide power take-off units which are applicable to various makes of automobiles and their associated transmissions and which are capable of selectively providing a variety of power take-off sources, in the form of power shafts, the speed and direction of which are capable of variation at the will of the operator.

It is also an object of my invention to provide a power take-off unit having at least one power take-off shaft, the speed and direction of which can be varied at the will of the operator and which shaft is detachably mounted upon the main casing of the power take-off unit so as to be capable of being mounted upon said casing to extend, optionally, from one side or from the opposite side thereof.

It is yet a further object of the invention to provide a power take-off unit having a power take-off shaft capable of providing different forward speeds as well as a reverse speed.

A still further object of the invention is to provide a power take-off unit having two take-off shafts, one of which is capable of providing a power take-off source of one direction and the other of which is capable of providing a power take-off source of opposite direction as well as of variable speed, either of said power shafts being capable of being selectively engaged for operation at the will of the operator.

Further objects and advantages of the invention, residing in the construction, arrangement and combination of parts will appear clear from a consideration of the following description of one embodiment of the invention, by way of example, with reference to the accompanying drawings in which:

Fig. I is a side elevational view of a power take-off unit in accordance with the invention, Fig. II is an end view of Fig. I, taken from the left, Fig. III is an end view of Fig. I taken from the right, and Fig. IV is a vertical section on the line A—A of Fig. II.

Referring to the drawings, 10 indicates the hollow casing of a power take-off unit, which casing has an opening 12 at one side through which a gear cluster 14 extends for engagement with a driving gear transmission (not shown), such as the gear transmission of a motor vehicle or tractor, upon which the casing is adapted to be secured.

The casing has opposed side walls 16, with axially aligned bores 18, 18′ and 20, 20′ in which separately formed casing structures 22, 22′ and 24 are detachably mounted upon the casing 10, by means of the screw bolts 26, and which casing structures are capable of being interchanged with one another. In the drawings the casing parts 22, 22′ are shown fitted in the bores 18, 18′ on the left of the casing 10, whereas the single casing structure 24 is shown fitted in the bore 20, 20′ on the right. The construction and arrangement is such, however, that these casing parts can be demounted from the casing 10 and interchanged with respect to the bores 18, 18′ and 20, 20′ so that the single casing structure (with its contained gear components, later to be described) is on the left of the casing 10 and the other casing parts 22, 22′ are on the right. The one de-mountable casing part 22 is in the form of an end cap enclosure for one of the take-off power shafts (later described), whereas the other de-mountable casing part 24 serves to house an extension shaft and selector mechanism of the second take-off power shaft of this power take-off unit.

The gear cluster 14 includes adjacent integral and different size gear rings 28 and 30 mounted upon a shaft 32 through the medium of the roller bearings 34, the shaft 32 being journalled upon the casing 10 at its opposite ends so that the gear rings 28 and 30 partially project outside the opening 12, as seen in Figs. II and III. The construction and arrangement is such that the power take-off unit can be secured upon a vehicle adjacent the transmission thereof with the gear ring 30 constantly in mesh with one of the transmission gears.

Also journalled in the opposed casing walls 16 are two shafts 36 and 38 (Fig. IV), disposed in adjacent spaced and parallel relationship as shown.

The shaft 36 is rotatably mounted in the casing 10 by the roller bearings 40 and is axially splined, as indicated at 42, for the mounting thereon of a gear ring 44, axially adjustable upon the splined shaft portion under the control of selector mechanism, indicated generally at 46. This shaft 36 has a reduced end portion 36′ which projects outside the corresponding casing wall 16, as seen in Fig. IV, and is normally enclosed in the separate casing structure 24, as and for the purpose to be described later.

The other shaft 38 is rotatably mounted in the casing by the roller bearings 48 and has an end portion 38′ which extends into the casing structure 22, as and for the purpose to be described later. This shaft 38 has a gear cluster 50 keyed thereon by the key 52 and held against axial movement by the spacer ring 54.

The gear cluster 50 has adjacent integral and different size gear rings 56 and 58, of which gear ring 58 is constantly engaged with gear ring 28.

The power take-off unit as thus far described is similar to that disclosed in said co-pending application, Serial No. 91,845.

The casing structure 24 has a stub shaft 60 fixedly mounted therein by the grub screw 62 and supporting axially spaced needle bearings 64 upon which there is mounted a gear cluster 66, providing two integral and different size gear rings 68 and 70.

The reduced end portion 36′ of the shaft 36 has a gear ring 72 keyed thereon by the key 74 and in mesh with the gear ring 68. This gear ring 72 is shown as being of the same size as the gear ring 70.

The gear ring 72 has a sleeve portion 72′ which extends beyond the shaft portion 36′ and serves for the mounting therein, by the needle bearings 76, of the reduced end 78′ of a further shaft 78 mounted at its opposite end, by the roller bearings 80, in an end cap 82 secured upon the casing structure 24 by screw studs 84 or the like.

The sleeve extension 72′ of the gear ring 72 has an external spline 86 axially aligned with a similar internal spline 88 on a sleeve 90 axially slidable upon a splined portion 92 of the shaft 78 and carrying a gear ring 94, which is shown as of the same size as the gear ring 68. This gear ring 94 also has internal splines 96 axially aligned with a ring of external splines 98 on the shaft 78.

100 is a spacer ring, holding the gear cluster 66 against axial movement on its shaft 60, 102 end thrust rings for the needle bearings 76, 104 a snap ring and 106 a seal assembly.

The sleeve 90 and gear ring 94 are axially adjustable upon the splined shaft portion 92 under the control of a selector mechanism indicated generally at 108. This selector mechanism, as also the previously mentioned selector mechanism 110 and the selector mechanism 46 have acquired a distinct status in the power take-off art as being suitable for actuation by an operator to connect the power take-off gears and shafts for their required operation.

Referring now to the shaft 38, this, as stated, has the end portion 38′. This shaft portion extends into the casing structure 22 and has a central opening in its outer end, in which there is rotatably mounted, by the needle bearings 112, the reduced end portion 114′ of a shaft 114 rotatably supported in the casing structure 22 at its opposite end by the needle bearings 116. The shaft 114 projects outside the casing structure 22 and is shown sealed therein by the seal structure 118.

The shaft 114 and also the shaft portion 38′ have axially aligned splines 120 and 122, respectively. Mounted for axial adjustment upon the splines 120 there is a sleeve 124, actuatable by the selector mechanism 110, and having either of two positions determined by the spring urged ball 126 and the axially spaced recesses 128.

In the position shown in Fig. IV the sleeve 124 is in neutral position and there is no driving connection between the shaft 38 and the shaft 114. If, however, the sleeve 124 is shifted to the right the sleeve will connect the splines 120 and 122 to thereby cause the shaft 114 to be driven from the shaft 38.

In the operation, and with the parts as shown in Fig. IV shafts 36 and 38 will be rotated from the gear rings 28 and 30 as idlers, since both sleeves 90 and 124 and the gear ring 44 are in neutral position, it being appreciated that gear 58 is constantly driven from gear 28 so that it will always drive the gear 56 integral therewith.

If gear ring 44 is shifted to the right, as viewed in Fig. IV, and sleeve 124 is shifted to connect the splines 120 and 122, the shaft 114 will be connected to be driven in the same direction as shafts 36 and 38 by a drive from gear ring 28 onto gear ring 58 as well as from gear ring 28 onto gear ring 44. If now, however, gear ring 44 is shifted to the left to engage gear ring 56 shaft 42 will be driven in reverse sense due to the engagement of the larger size gear ring 56. The shaft 78 will not be rotated as the sleeve 90 is in a neutral position.

With reference to the shaft 78, with the sleeve 90 as shown neutral condition prevails. If sleeve 90 is shifted to the left to engage the splines 88 and 86 there is a direct through drive onto shaft 78 from shaft 36, this drive being at 1 to 1 ratio with the gear size and relation shown. If, however, sleeve 90 is shifted to the right, from the neutral position shown in Fig. IV to cause the splines 96 on gear ring 94 to engage the splines 98 the shaft 78 will be driven at reduced ratio via the then engaged gear train 72—68—70 and 94. It is thus possible to drive the shaft 78 in forward direction at two different speed ratios.

By shifting gear ring 44 to engage the gear ring 56 and shifting the sleeve 90 to the alternate positions just mentioned it is also possible to drive the shaft 78 at said two different speed ratios but in reverse direction.

It will be appreciated, therefore, that I have provided a power take-off unit which retains the sturdy and robust characteristics of my previous power take-off units as well as the versatile character of the power take-off unit disclosed in my said co-pending application but incorporates a change speed and reversing gear-box assembly which is of exceedingly compact design and can be readily installed upon the main casing structure of the power take-off unit to enable a variety of operating conditions to be procured.

I claim:

In a power take-off unit having a main hollow casing with opposite side walls having openings and a bottom opening through which gearing on a first shaft supported in said casing is capable of being engaged with the gearing of a main transmission for rotating other gearing mounted upon a second shaft within said casing, the provision of means closing said side wall openings and operatively associated with said gearing to provide power take-off shafts extending from opposite sides of said casing, said means comprising first and second separate casing parts, said first casing part being demountably connected with said main casing in closing relation to a said opening in one side wall of the main casing, and said second casing part being demountably connected with said main casing in closing relation to openings in the opposite side of the main casing in which the corresponding ends of said second shaft and a third shaft in said main casing are rotatably mounted, said second shaft carrying a gear unit composed of two gear rings, one of which is in constant mesh with a gear ring on said first shaft and said third shaft carrying a gear ring axially adjustable thereon for alternative engagement with a gear ring on said first shaft or with a gear ring of said gear unit, said first casing part housing a power take-off shaft and including means for alternatively connecting said power take-off shaft for rotation or non-rotation by said second shaft in the main casing and said second casing part housing a second power take-off shaft carrying an axially adjustable sleeve and gear ring, a stub shaft with a gear cluster thereon and including means for connecting said second power take-off shaft for rotation through selected gear rings of said gear cluster.

References Cited in the file of this patent

UNITED STATES PATENTS

| | | |
|---|---|---|
| 1,713,271 | Eason | May 14, 1929 |
| 2,220,542 | Peterson | Nov. 5, 1940 |
| 2,306,767 | Wagner | Dec. 26, 1942 |
| 2,313,679 | Tanger | Mar. 9, 1943 |
| 2,542,911 | Eaton | Feb. 20, 1951 |